(12) United States Patent
Walker

(10) Patent No.: US 10,394,048 B2
(45) Date of Patent: Aug. 27, 2019

(54) EYEWEAR SECURING SYSTEM AND METHOD

(71) Applicant: COMMON SENSE INVENTIONS, INC., Midlothian, VA (US)

(72) Inventor: Christopher S. Walker, Midlothian, VA (US)

(73) Assignee: COMMON SENSE INVENTIONS, INC., Midlothian, VA (US)

(*) Notice: Subject to any disclaimer, the term of this patent is extended or adjusted under 35 U.S.C. 154(b) by 436 days.

(21) Appl. No.: 14/722,207

(22) Filed: May 27, 2015

(65) Prior Publication Data

US 2015/0346509 A1 Dec. 3, 2015

Related U.S. Application Data

(60) Provisional application No. 62/004,166, filed on May 28, 2014.

(51) Int. Cl.
*G02C 3/02* (2006.01)

(52) U.S. Cl.
CPC ..................... *G02C 3/02* (2013.01)

(58) Field of Classification Search
CPC ........ G02C 3/02; G02C 2200/02; A42B 3/225
USPC .................................................. 351/155, 158
See application file for complete search history.

(56) References Cited

U.S. PATENT DOCUMENTS

| 6,367,126 | B1 | 4/2002 | Rivkin | |
|---|---|---|---|---|
| 7,496,991 | B2 | 3/2009 | Avery | |
| D643,212 | S | 8/2011 | Rathbun | |
| 8,235,262 | B1 | 8/2012 | Sakdol | |
| 8,696,112 | B1* | 4/2014 | Vaught | G02C 3/02 351/155 |
| 2006/0005361 | A1* | 1/2006 | O'Banion | A42B 1/24 24/303 |
| 2010/0309425 | A1* | 12/2010 | Zelazowski | G02C 1/08 351/138 |
| 2012/0086530 | A1 | 4/2012 | Rathbun | |
| 2012/0125046 | A1* | 5/2012 | Vander Wal | H01F 7/0263 63/1.18 |

FOREIGN PATENT DOCUMENTS

WO  2013121169 A2  8/2013

OTHER PUBLICATIONS

PCT International Search Report and Written Opinion for PCT/US2015/032533, dated Aug. 14, 2014, 7 pages.

\* cited by examiner

*Primary Examiner* — Evan P Dzierzynski
*Assistant Examiner* — Alberto J Betancourt
(74) *Attorney, Agent, or Firm* — Patent Law of Virginia, PLLC; Brian J. Teague

(57) ABSTRACT

A system for securing eyewear comprises an elongated flexible band having first and second ends, a first magnet encased in the first end, a second magnet encased in the second end, and a backplate comprising a third magnet or a ferrous metal plate, The first magnet is stronger than the second magnet.

8 Claims, 4 Drawing Sheets

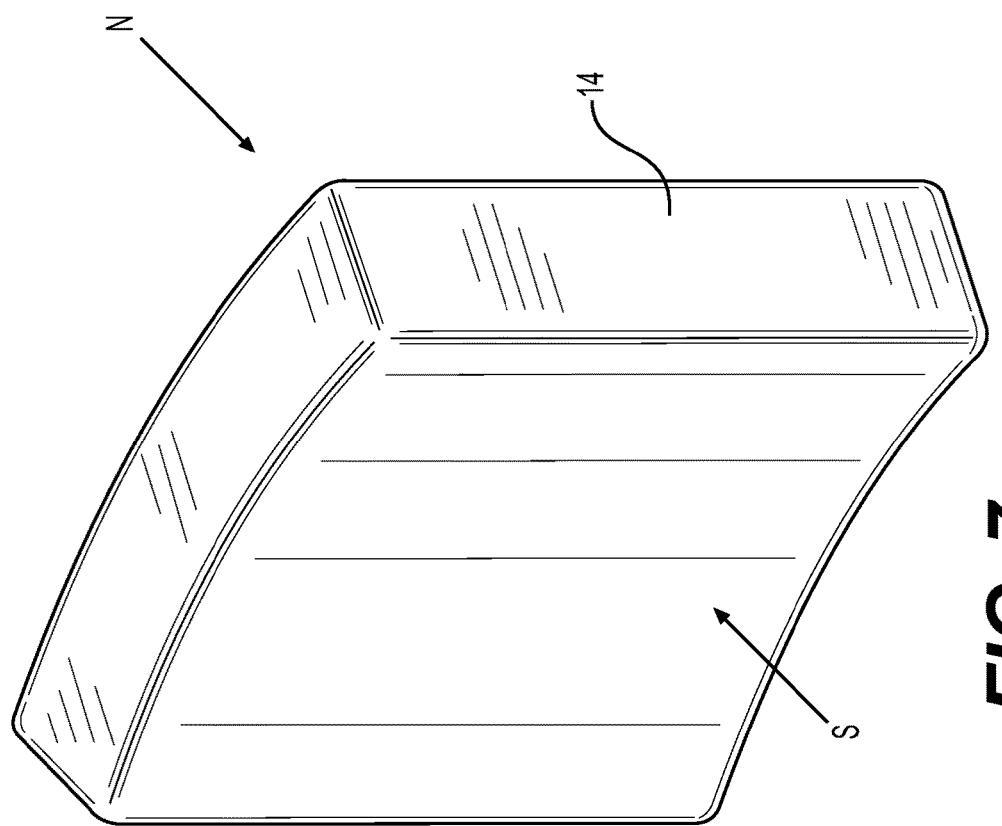

EYEWEAR SECURING SYSTEM AND METHOD

CROSS-REFERENCE TO RELATED APPLICATIONS

This application claims priority to U.S. Provisional Application Ser. No. 62/004,166, filed May 28, 2014, the contents of which are incorporated herein by reference in its entirety.

FIELD OF THE INVENTION

The present disclosure relates generally to eyewear, and more particularly to systems and methods for securing eyewear, such as to hats.

BACKGROUND

People who wear eyewear may only need to wear the eyewear intermittently (for example, reading glasses and sunglasses), but will often keep their eyewear with them in case it may be needed. Such people often struggle to securely and safely store the eyewear on their person such that the eyewear is not damaged but is readily accessible. Some people will place their eyewear on their hat. However, such a solution is not optimal, as the eyewear can readily fall off the hat.

BRIEF SUMMARY

In one embodiment of the invention, an eyewear securing system comprises an elongated flexible band having first and second ends, a first magnet encased in the first end, a second magnet encased in the second end, and a backplate comprising a third magnet or a ferrous metal plate. The first magnet is stronger than the second magnet.

When the band is arranged in a straight, unflexed position, the first and second magnets may be generally parallel and have polarities facing in opposite directions.

The first magnet may have a 4.9 pound-force pull and the second magnet may have a 1.8 pound-force pull. The first and second magnet may comprise rare earth magnets. The band may be constructed of silicone.

The backplate may be curved and may have opposing convex and concave sides. The backplate may comprise an adhesive material affixed to the convex side In addition to the eyewear securing system, as described above, other aspects of the present invention are directed to corresponding methods for securing eyewear.

BRIEF DESCRIPTION OF THE SEVERAL VIEWS OF THE DRAWING(S)

The foregoing summary, as well as the following detailed description of the disclosure, will be better understood when read in conjunction with the appended drawings. For the purpose of illustrating the disclosure, there are shown in the drawings embodiments which are presently preferred. It should be understood, however, that the disclosure is not limited to the precise arrangements and instrumentalities shown. In the drawings:

FIG. 7 is a perspective view of another component of the system of FIG. 1.

DETAILED DESCRIPTION

Figure 2:
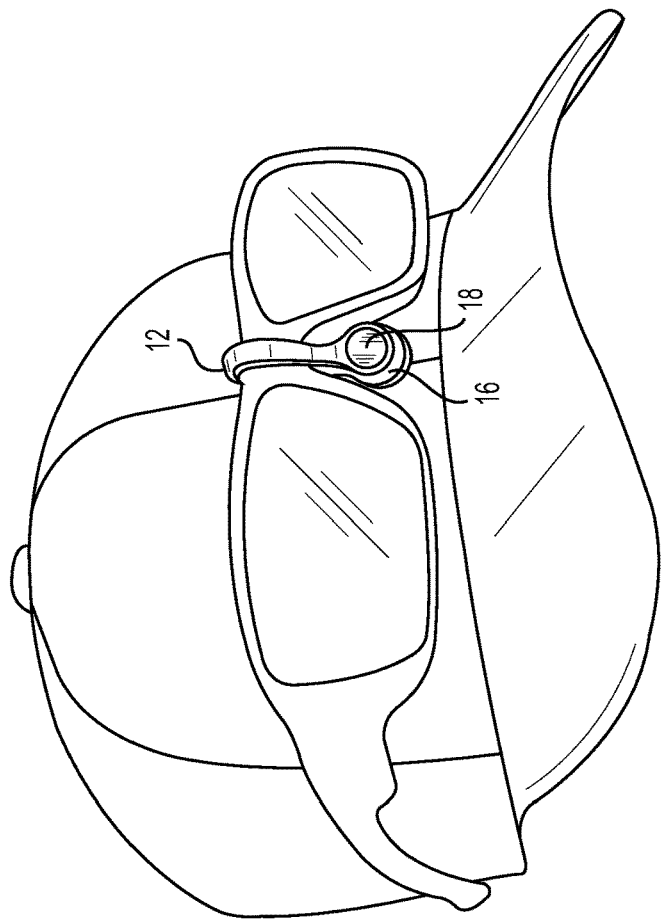
FIG. 2 is a perspective view of the system of FIG. 1 in use securing eyewear to a hat.

Certain terminology is used in the following description for convenience only and is not limiting. The words "lower," "bottom," "upper," and "top" designate directions in the drawings to which reference is made. The words "inwardly," "outwardly," "upwardly" and "downwardly" refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

The eyewear securing system of embodiments of the invention provide a solution to the above-described problem by removing the need to fasten straps, cables, or other accessories to eyewear in an attempt to create a closed loop for hanging the eyewear around the neck. In addition, the system is designed to minimize any additional steps needed to retrieve the eyewear from the hat and place the eyewear back over the user's eyes for normal usage.

The flexible band of the eyewear securing system of embodiments of the present invention is used to create a closed loop that encompasses the nose bridge and/or top bar of common eyewear and holds the eyewear in place at that point to a variety of hats. As described in more detail below, the flexible band of the eyewear securing system of embodiments of the present invention is attached to the hat utilizing magnets molded into the ends of the flexible band and a third magnet (or ferrous metal plate) placed on the inside or interior of any of a variety of hats, whether inside the brim of a traditional baseball hat or similar headwear, or on the interior of any other hat and is used to hold the device in place.

Referring to the drawings in detail, wherein like numerals indicate like elements throughout, FIGS. 1-7 illustrate a system for securing eyewear, in accordance with embodiments of the invention. The system 10 comprises an elongated flexible band 12 and a backplate 14. The band has a first end 16 and a second end 18. The band 12 is capable of bending onto/over itself to create a loop. A first magnet 20 is encased in the first end 16 and a second magnet 22 is encased in the second end 18. The backplate 14 comprises a third magnet or a ferrous metal plate. Importantly, as described further below, the first magnet 20 is stronger than the second magnet 22.

Figure 6:
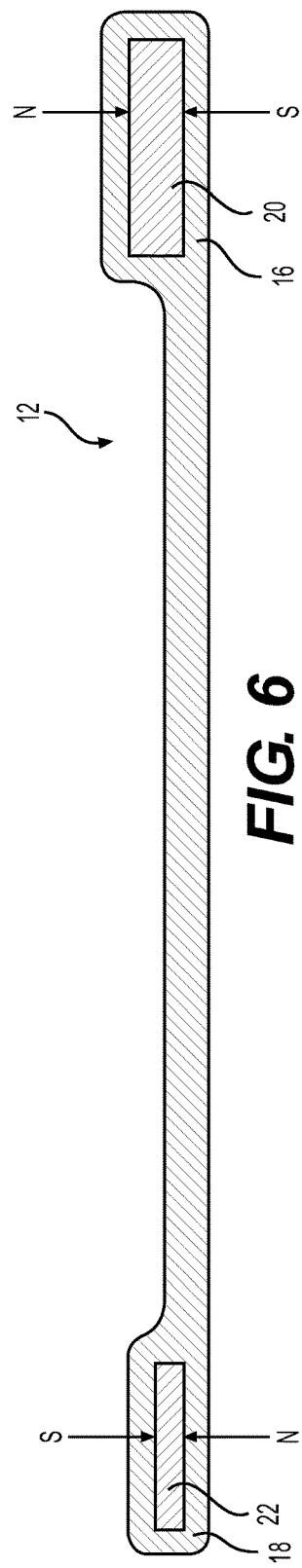

As seen in FIG. 6, when the band 12 is arranged in a straight, unflexed position, the first and second magnets 20, 22 are generally parallel and, importantly, have polarities facing in opposite directions so as to attract each other when in use. In FIG. 6, the north pole of the first magnet is on the top and the south pole is on the bottom. Conversely, in FIG. 6, the south pole of the second magnet is on the top and the north pole is on the bottom. (It would also work if the polarities of both the first and second magnets were flipped.) This difference in polarity arrangement of the magnets is important to ensure that the band 12 secures to the backplate 14 properly and so that the second end 18 secures to the first end 16 properly, as described further below.

As seen in FIG. 7, the backplate 14 may be curved to better correspond with the curved shape of a hat. If the backplate is curved, the convex side should be the north pole and the concave side should be the south pole, as illustrated in FIG. 7, to ensure that the first end 16 of the band 12 secures to the backplate 14 properly (assuming the polarities of the first and second magnets are as shown in FIG. 6). (If the polarities of both the first and second magnets were flipped from what is shown in FIG. 6, then the polarity of the backplate should also be flipped from what is shown in FIG. 7.)

The purpose of the eyewear securing system of embodiments of the invention is to provide a binding or securing point to temporarily attach eyewear on any one of a variety of hats (or other items, including other items of clothing). The loop created by the flexible band folds around the top bar of the eyewear (if present) and/or around the nose bridge of the eyewear. The first end 16 of the band 12 connects to the hat via the backplate 12 (which may also be termed a hat magnet) which is placed inside the hat (or alternatively a ferrous metal plate placed inside the hat), and the second end 18 of the band connects to the first end 16 via a magnet to complete the loop and secure the eyewear in place.

The first magnet 20 is encased or embedded in the first end 16 of the flexible band 12 and the second magnet 22 is encased embedded in the second end 18 of the flexible band 12. The first and second magnets may be respectively encased in the first and second ends by, for example, overmolding.

Advantageously, the first magnet 20 is stronger than the second magnet 22. This is accomplished by using different size magnets and/or materials for the magnets. This first magnet 20 is stronger than the second magnet 22 so that pulling the second end 18 away from the first end 16 (and therefore separating the first and second magnets) to retrieve the eyewear does not pull the first magnet 20 away from the backplate 14. As such, the first end 16 stays affixed to the hat. In one embodiment of the invention, the first magnet 20 has a 4.9 pound-force pull and the second magnet 22 has a 1.8 pound-force pull.

The first and second magnets and the backplate work together, and individually, to facilitate the functionality of the invention. For example, the first and second magnets and the backplate work together to hold the system and the eyewear on a hat, while the second magnet also works to just hold the eyewear inside the "loop."

Figure 1:
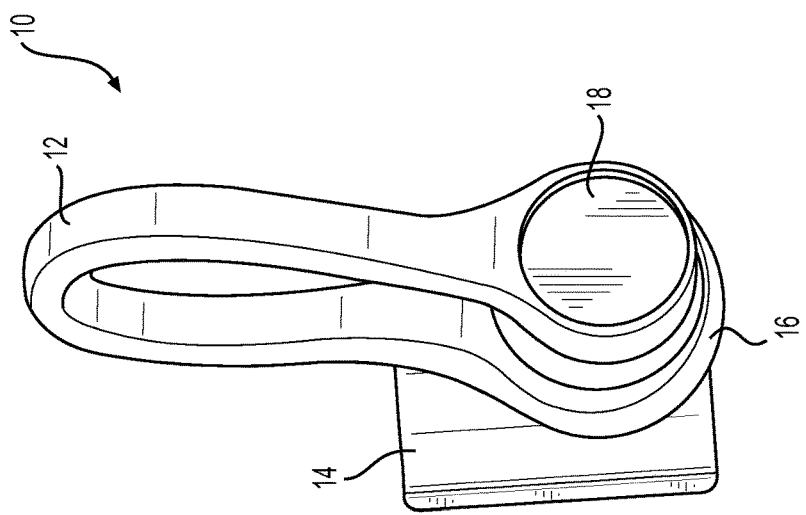
FIG. 1 is a perspective view of a system for securing eyewear, in accordance with embodiments of the invention.
Figure 3:
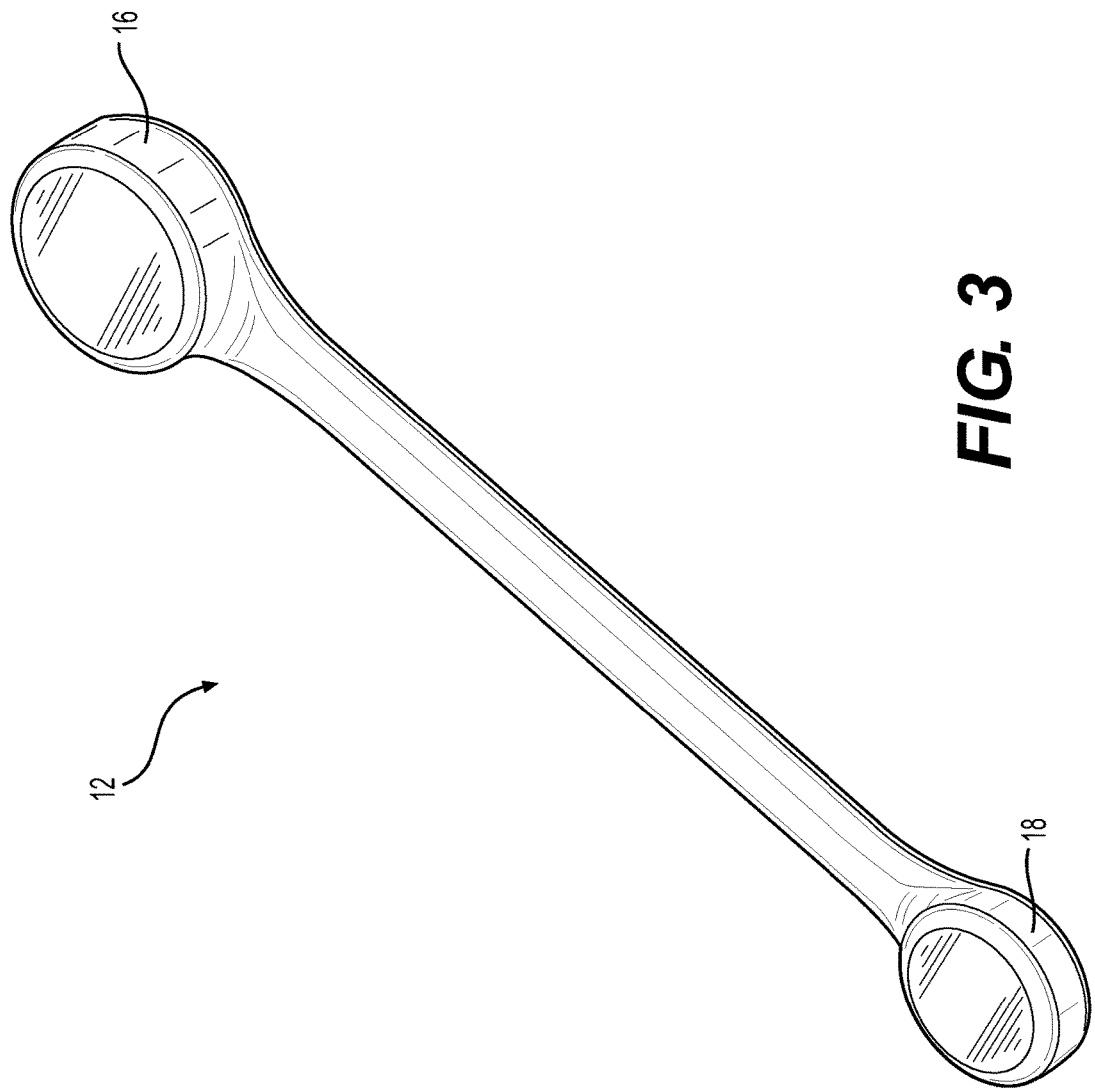
FIGS. 3-6 are, respectively, perspective, top, side, and sectional views of one component of the system of FIG. 1.
Figure 4:
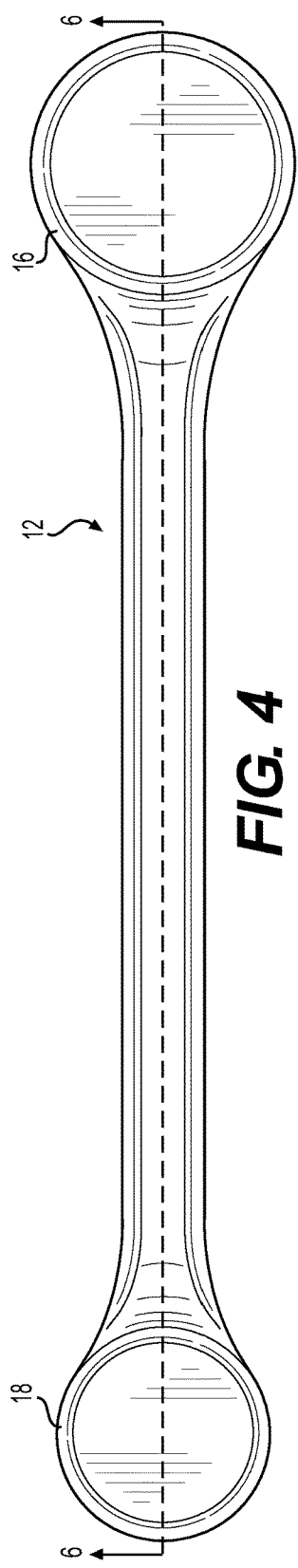
Figure 5:
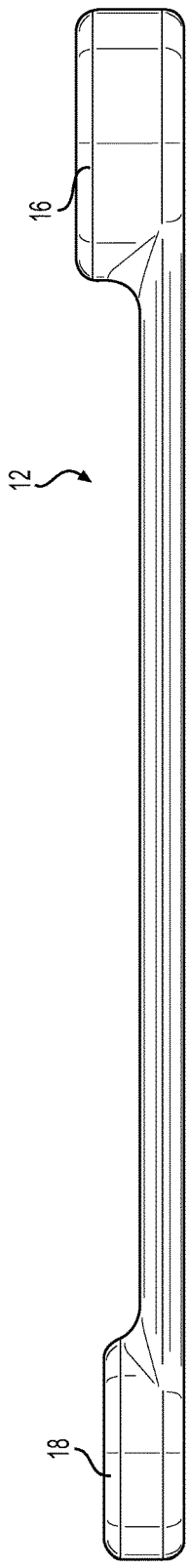

The first and second ends 16, 18 of the band 12 may have any suitable shape, including but not limited to oval, round, teardrop, square, or rectangular. The first and second ends 16, 18 may (but do not necessarily) both have the same shape. In FIGS. 1, 3, and 4 it can be seen that the flexible band 12 is narrow in the center and teardrops outward to form to rounded ends. The width and length of the band may vary as long as it is sufficient to hold the desired eyewear within the flexible band loop via the nose bridge/top bar of the eyewear.

The flexible band 12 may be constructed from silicone or a like material capable of flexing and bending without readily breaking. In one embodiment of the invention, the band 12 is approximately 3.5" in length.

The first and second magnets may comprise any suitable magnet, but are preferably rare earth magnets, such as neodymium magnets or any other suitable rare earth magnets, that provide the desired force to close the loop when in close proximity to each other and to keep the loop closed to adequately secure the eyewear. The backplate may comprise any suitable magnet (if it is not a ferrous plate), but is preferably a rare earth magnet, such as a neodymium magnet or any other suitable rare earth magnets, that provides the desired force to retain the flexible band and the eyewear to a hat or the like.

The first and second magnets may have different sizes, as seen in FIG. 6, or may be the same size. However, if the first and second magnets are the same size, then a weaker type of magnet should be used for the second magnet than for the first magnet as it is desirable that the first magnet be stronger than the second. If the same type of magnet is used for both the first and second magnets, then the second magnet should be smaller than the first magnet so that the first magnet is stronger than the second magnet.

The first and second ends may have different sizes (as shown) or may both have the same size. The first and second ends may have the same size even if the first magnet is larger than the second magnet. In such a case, there would be more flexible material over-molded on the smaller magnet. In one embodiment of the invention, the second end is roughly a ⅓" smaller in diameter than the first end. The second end may be termed the logo end (or LOG logo O oval) because this end is in front when in use and will often contain a logo or product name. The first end (the larger end) may be termed the "hat-side" end (or hat-side oval) as the stronger magnet in this end is capable of holding the device in place on the hat when coupled with the interior backplate.

The encasement or overmolding of the magnets within the ends of the flexible band helps prevent the magnets from becoming dislodged from the band and protects the magnets from damage and degradation. The second end may be smaller than the first end so as to minimize the overall bulk of the design but its size is also functional in design. The second end may be smaller and lighter so as to easily rebound downward and reconnect with the opposite pole first magnet within the first end.

The first end is typically larger in size than the second end because the encased first magnet must typically be larger (both in diameter and thickness) and stronger than the second magnet to hold the band in place on the hat when coupled with the opposite pole magnet placed in the interior of the hat.

The function of the backplate 14 is to help hold the device in place on the hat both while the glasses are stationary and held within the flexible band on the hat as well as when the eyewear are removed from the flexible band loop through normal user motion (e.g., pulling on the eyewear). The size and shape of the backplate are determined by the magnetic pull-rate needed to hold the device on most hats as well as shaped to provide comfort when positioned on the interior of the hat.

In the use of an eyewear securing system of embodiments of the invention, a user first positions the backplate 14 within the interior of a hat. It may be desirable to position the backplate in the hat so that when the band 12 is coupled with the backplate 14 the system does not obstruct any logo present on the hat. Double-sided tape or any other suitable adhesive may be used to help secure the backplate within the hat, if desired. Next, the flexible band may be "closed" (i.e., the first and second ends are secured together by bringing the two ends in contact or close enough proximity to cause the first and second magnets to attract) with the logo facing outward. Next, the flexible band is placed on the outer surface of the hat, adjacent or directly above the backplate placement, with the first end contacting the hat or in close enough proximity to cause the first magnet and the backplate to attract. The loop of the band should ideally be on top (i.e., above the ends, as seen in FIG. 2) when attached to the hat, such that the loop closes on its own (due to gravity pulling the second end down toward the first end) after it has been opened. The magnetic pull rate of the backplate and the first magnet will allow the system to be held in place.

Now that the system is properly positioned, with the logo facing outward and downward, simply open the loop by grasping the second end 18 and lifting upward so as to lay it back on the hat fabric. Next, position the eyewear nose bridge and/or top bar above and over the first end so that the first end is about where a wearer's nose would be when the eyewear is worn. The temples of the eyewear should be placed on either side of the hat, as seen in FIG. 2. Finally, simply begin lowering the second end until the magnetic pull of the magnets encased in both first and second ends is felt and release. In almost all cases, the first and second magnets will find each other and create a strong connection which creates the loop. The system now has firm grasp of the nose bridge/top bar of the eyewear and cannot easily be removed without deliberate force.

To retrieve the glasses from the hat, simply grasp the eyewear by the eyewear frame (such as the temples) and pull forward to release the magnetic pull of the second magnet from the first magnet. The second end will rebound upward creating the release and immediately rebound downward back into position to create the closed loop once again, self-positioning for the next use.

When the system is not in use, it is possible that the flexible band 12 can be stored in a position other than the deployed position of a hat. The flexible band 12 can be attached to the hat so that either end of the band can be placed on one side of a portion of the hat surface and the opposite end on the opposite side of the hat surface and held in place via the magnetic poles of the first and second magnets. As an example, when not in use to hold eyewear, the flexible band may be attached to the brim of a hat by placing the first end on one side of the brim and the second end on the opposite side of the brim, with the first and second ends in close proximity (on opposite sides of the brim) so that the first and second magnets attract and secure the band to the brim.

In addition, the eyewear securing system of embodiments of the invention can be worn in any fashion on a hat. As long as there is a suitable area on the interior of the hat to place the backplate, hats can be worn in any fashion with the eyewear securely fastened inside the system. As an example, typical baseball caps can be worn backwards with the system securely in place on the upper backside of the hat. However, for ease of removal of the eyewear from the system, the sunglasses most often would rest in the same position along the forehead. It is possible, however, to wear the system with the sunglasses resting in the system on the back of the hat (with the hat worn facing forward), and removal of the eyewear would occur by pulling the sunglasses backward away from the back of the head.

Finally, the eyewear securing system of embodiments of the invention can be used to create a loop feasible for securing, albeit loosely, eyewear to other pieces of clothing as well as accessories such as women's purses. The system can be placed on either the interior or exterior of women's purses and used as a simple solution to secure eyewear in a familiar place for easy access. Using the flexible band as a simple closed loop around a belt loop can be utilized for easy access to the eyewear.

The band should be made of a flexible material such as silicone, thermoplastic elastomer, or other material capable of flexing, bending, and rebounding during removal operation. In addition, the magnets encased in the oval ends are typically neodymium "rare earth" magnets. This is necessary in order to facilitate the proper magnetic pull rate to insure proper operation of the system when in use as well as secure the system to the hat at all times. One unique feature of this system is that when the system is engaged in use with eyewear captured in the loop, the three magnets of the system work together to create a stronger pull rate and subsequently further insure the system stays secure on the hat.

Finally, the second end is designed to allow for inclusion of a logo. Adding such a logo can be accomplished by any suitable means, including post production printing, in-mold decoration, or post production label installation. In addition, the band may have imprinted icon designs and wording on the band itself which is typically created by in-mold tooling printing.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

That which is claimed:
1. A method for securing eyewear, comprising:
   placing a backplate inside a hat against an inner surface of the hat, the backplate comprising a magnet;
   positioning a first end of an elongated flexible band against an outer surface of the hat adjacent the backplate so that a magnetic attraction between a first magnet encased in the first end and the backplate causes the first end and the backplate to magnetically couple;
   positioning at least a portion of a bridge or top bar of eyewear adjacent the first end;
   bending the band around at least a portion of the bridge or top bar; and
   positioning a second end of the band adjacent the first end so that a magnetic attraction between a second magnet encased in the second end and the first magnet causes the second end and the first end to magnetically couple, while ensuring that at least a portion of the bridge or top bar is encircled by a loop formed by the bending of the band;
   wherein the first magnet is stronger than the second magnet.
2. The method of claim 1, wherein, when the band is arranged in a straight, unflexed position, the first and second magnets are generally parallel and have polarities facing in opposite directions.

3. The method of claim 1, the first magnet has a 4.9 pound-force pull and the second magnet has a 1.8 pound-force pull.

4. The method of claim 1, wherein the first and second magnet comprise rare earth magnets.

5. The method of claim 1, wherein the band is constructed of silicone.

6. The method of claim 1, wherein the backplate is curved and has opposing convex and concave sides.

7. The method of claim 6, wherein the backplate comprises an adhesive material affixed to the convex side.

8. The method of claim 1, wherein placing a backplate inside a hat against an inner surface of the hat comprises placing the backplate into an interior cuff of the hat.

* * * * *